Oct. 21, 1969  L. E. HENYON  3,473,402
APPARATUS FOR POSITIONING GEARS AND/OR CLUTCH HUBS ON A SHAFT
Filed Nov. 24, 1967  4 Sheets-Sheet 1

INVENTOR
LEWIS E. HENYON
BY *Robert H. Johnson*
ATTORNEY

Oct. 21, 1969 L. E. HENYON 3,473,402
APPARATUS FOR POSITIONING GEARS AND/OR CLUTCH HUBS ON A SHAFT
Filed Nov. 24, 1967 4 Sheets-Sheet 2

INVENTOR
LEWIS E. HENYON
BY Robert H. Johnson
ATTORNEY

Oct. 21, 1969     L. E. HENYON     3,473,402

APPARATUS FOR POSITIONING GEARS AND/OR CLUTCH HUBS ON A SHAFT

Filed Nov. 24, 1967     4 Sheets-Sheet 3

*INVENTOR*
LEWIS E. HENYON
BY *Robert H Johnson*
ATTORNEY

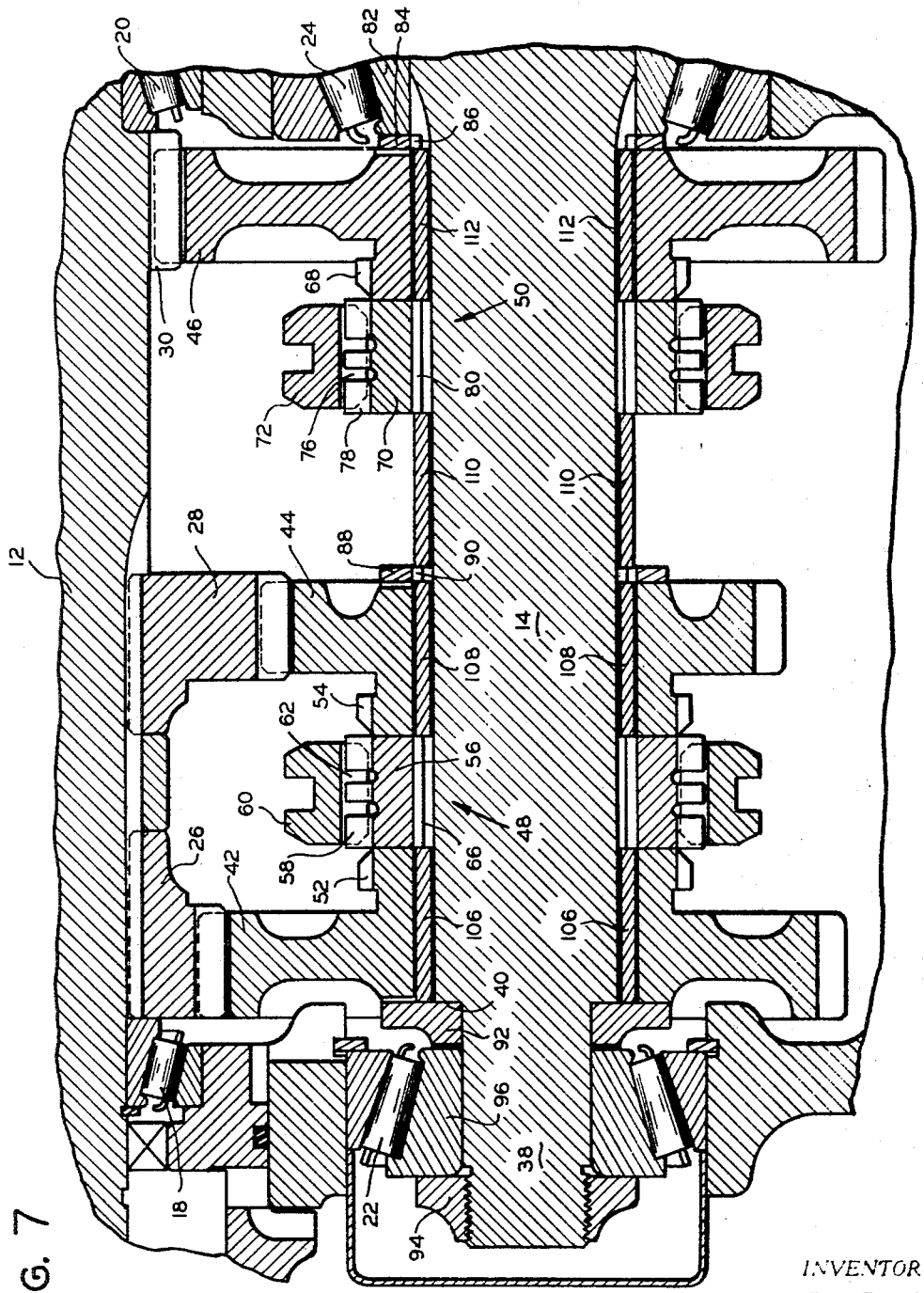

United States Patent Office 3,473,402
Patented Oct. 21, 1969

3,473,402
APPARATUS FOR POSITIONING GEARS AND/OR CLUTCH HUBS ON A SHAFT
Lewis E. Henyon, Jackson, Mich., assignor to Clark Equipment Company, a corporation of Michigan
Filed Nov. 24, 1967, Ser. No. 685,566
Int. Cl. F16h 3/10
U.S. Cl. 74—375                    13 Claims

ABSTRACT OF THE DISCLOSURE

A constant mesh gear transmission with input and output shafts and a plurality of gear sets alternatively actuatable to transmit power from the input shaft to the output shaft. Each gear set has a gear fixed to the input shaft and a gear mounted for rotation on the output shaft and connectible thereto for conjoint rotation by means of a clutch which includes a hub splined to the output shaft. The gears are held in proper location on the output shaft by hubs and thrust washers. The location of the hubs and thrust washers is determined by the ends of a pair of bars disposed between different splines on the output shaft and grooves in the bars which engage the hubs and thrust washers not engaged by the ends of the bars.

Background of the invention

The field of art to which the invention pertains includes couplings.

A principal object of my invention is to provide apparatus for positioning gears and clutch hubs on a shaft which is simple, low cost and does not impose an axial load on the gears and hubs.

Summary of the invention

In carrying out my invention in a preferred embodiment thereof, I provide a splined shaft, at least one clutch hub splined to the shaft, a bar disposed between two of the shaft splines and including a groove therein which engages the hub, a gear carried by the shaft and rotatable relative thereto, and means for preventing longitudinal movement of the bar and retaining the gear on the shaft.

The above and other objects, features and advantages of my invention will be more readily understood by persons skilled in the art when the following detailed description is taken in conjunction with the drawing.

Brief description of the drawing

FIGURE 7 shows a modification of my invention.

Description of the preferred embodiment

Figure 1:
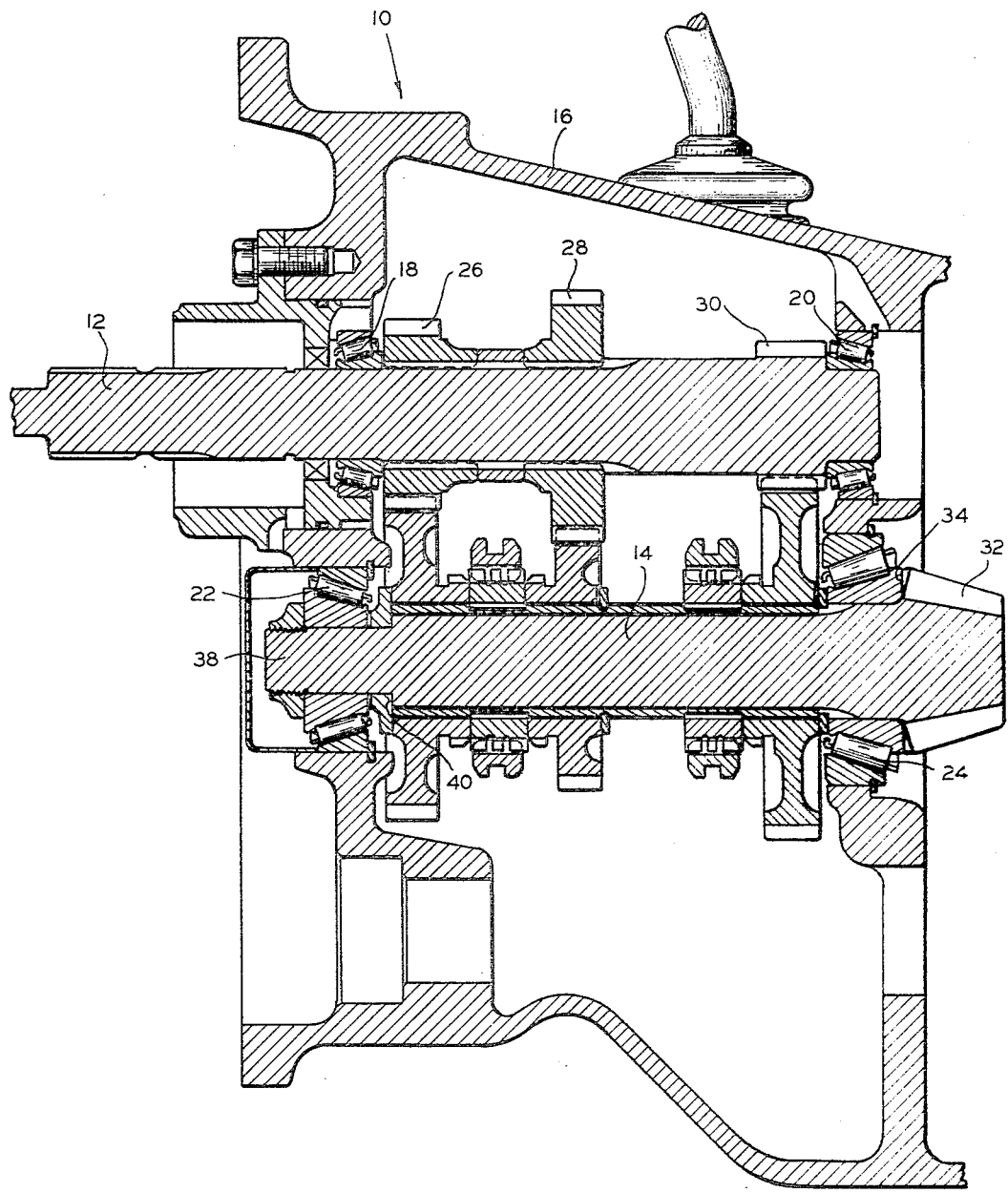
FIGURE 1 is a longitudinal section of a constant mesh gear transmission embodying my invention.
Figure 2:
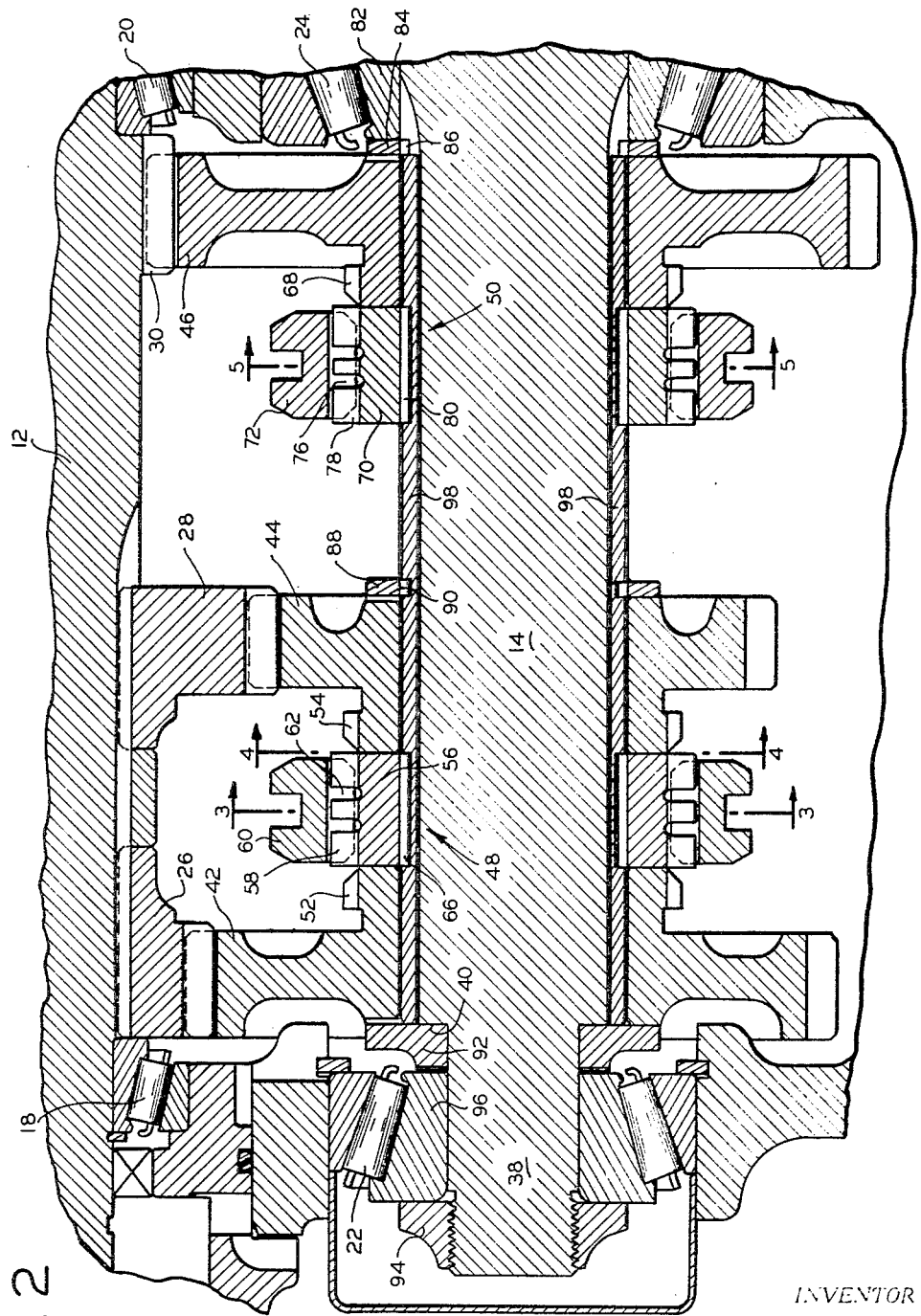
FIGURE 2 is an enlargement of a portion of FIG. 1 which shows to better advantage my invention.

Referring now to the drawing, and specifically FIGURES 1 and 2, the reference numeral 10 denotes generally a transmission including an input shaft 12 and an output shaft 14. Input shaft 12 is journaled for rotation in a housing 16 by means of roller bearings 18 and 20 and output shaft is journaled in housing 16 by means of roller bearings 22 and 24. Power is transferred between input shaft 12 and output shaft 14 by means of a plurality of gear sets, each of which includes a gear fixed to one of the shafts and a gear mounted for rotation on the other shaft and connectible thereto for conjoint rotation.

Splined to shaft 12 and spaced axially apart from each other is a pair of gears 26 and 28. Integral with shaft 12 is another gear 30.

Integral with output shaft 14 is a gear 32 which is adapted to mesh with the ring gear of a conventional differential. It will be noted that gear 32 defines with shaft 14 a shoulder 34. Output shaft 14 has external splines 36 along most of the length of it and a reduced diameter portion 38 at the end opposite gear 32 and which defines a shoulder 40.

Mounted for rotation on the splines 36 (FIGS. 3, 4 and 5) of output shaft 14 are three gears 42, 44 and 46 which mesh with gears 26, 28 and 30, respectively. Gears 42, 44 and 46 can be selectively connected to output shaft 14 for conjoint rotation therewith by means of a double tooth clutch 48 and a single tooth clutch 50, respectively.

Figure 4:
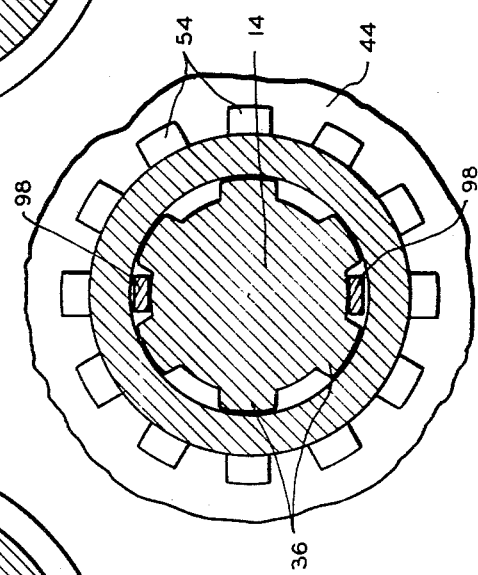
FIGURE 4 is a cross section taken along the line 4—4 of FIG. 2.
Figure 3:
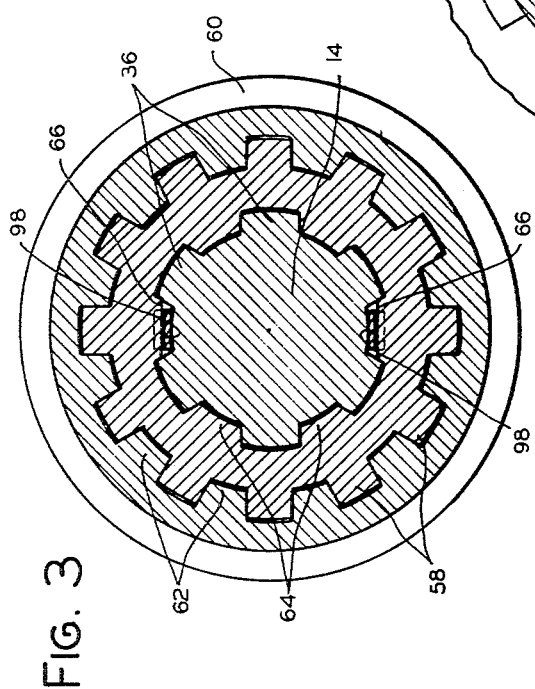
FIGURE 3 is a cross section taken along the line 3—3 of FIG. 2.
Figure 5:
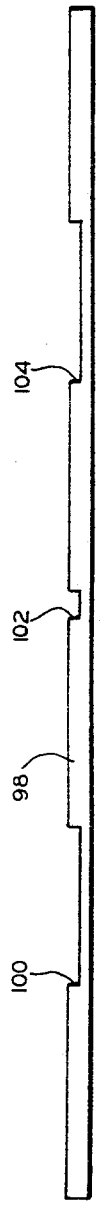
FIGURE 5 is a cross section taken along the line 5—5 of FIG. 2.

Referring now also to FIGS. 3, 4 and 5, tooth clutch 48 includes a tooth portion 52 integral with gear 42 and a tooth portion 54 integral with gear 44. Disposed between portions 52 and 54 is a clutch hub 56 which includes external teeth 58 and internal splines 64 which register with spline 36 so that rotation of hub 56 relative to shaft 14 is prevented. Also, hub 56 includes a pair of shallow splines 66 for reasons to be explained shortly. Slidable axially of hub 56 and carried thereby is a clutch collar 60 which includes internal teeth 62 that mesh with teeth 58 and can be brought into mesh selectively with tooth portion 52 or tooth portion 54 so as to connect either gear 42 or gear 44 to shaft 14 for conjoint rotation therewith.

Clutch 50 includes a tooth portion 68 integral with gear 46, a hub 70 located adjacent thereto and a shift collar 72. Hub 70 includes internal splines 74 which register with splines 36 so that hub 70 is connected to output shaft 14 for conjoint rotation therewith. Collar 72 includes teeth 76 which mesh with teeth 78 on hub 70 and is slidable axially so that teeth 76 can be brought into mesh with the teeth of tooth portion 68. Also, hub 70 includes a pair of shallow splines 80.

Disposed between the inner race 82 of bearing 24 and gear 46 is a thrust washer 84 which includes splines 86. Also carried by the splined portion of shaft 14 is another thrust washer 88 which is disposed adjacent gear 44, as shown, and includes splines 90 which engage splines 36 of shaft 14. Finally, a thrust washer 92 is carried by the reduced diameter portion 38 of shaft 14 and is disposed adjacent gear 42, as shown. Thrust washer 92 is held in abutment with shoulder 40 by means of a nut 94 which threadably engages reduced diameter portion 38 and is tightened down to hold the inner race 96 of bearing 22 snugly between thrust washer 92 and nut 94.

Figure 6:
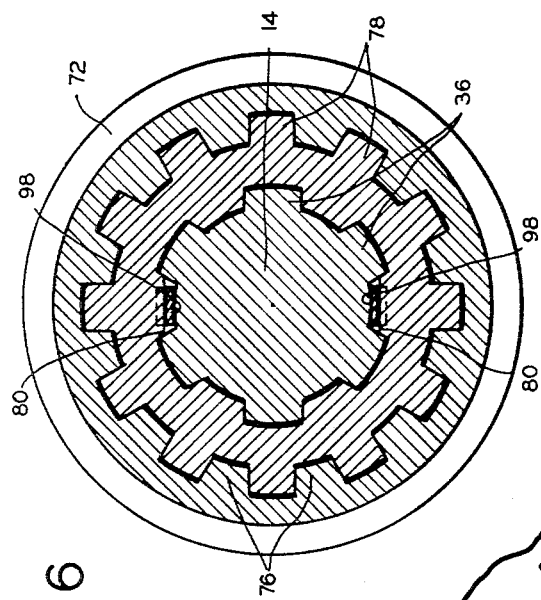
FIGURE 6 shows the spacer bar of my invention.

Referring now also to FIG. 6, disposed between the splines 36 of shaft 14 is a pair of bars 98. The ends of these bars abut the confronting faces of thrust washers 84 and 92 which are held from movement away from each other by bearing races 82 and 96 which in turn are held in position by shoulder 34 and nut 94, respectively. Thus, bars 98 are held from longitudinal movement relative to shaft 14. It also should be mentioned that thrust washers 84 and 92 not only serve to hold bars 98 from longitudinal movement along shaft 14, but also serve to retain the gears on the shaft. Each bar 98 includes a groove 100 which engages one of the shallow splines 66 of hub 56, a groove 102 which engages one of the splines 90 of thrust washer 88 and a groove 104 which engages one of the shallow splines 80 of hub 70. Consequently, the positions between hubs 56 and 70 and thrust washers 84, 88 and 92 are fixed relative to each other. At this point it will be noted that gear 42 is mounted for rotation on the splines 36 of shaft 14 between thrust washer 92 and gear 56. Similarly, a gear 44 is disposed between hub 56 and thrust washer 88 and gear 46 is disposed between hub 70 and thrust washer 84. The spacing between the thrust washers and hubs between which the various gears are disposed is such that each gear is held from any significant longitudinal movement relative to shaft 14, but at the same time there is a minimal amount of axial loading imposed on the various gears by the hubs and thrust washers so that the frictional drag on the gears is kept at a minimum.

At this point it will be appreciated that my invention provides a very low-cost and simple apparatus for positively positioning gears and hubs on a splined shaft without the necessity of cutting any circumferentially extending grooves in the shaft and without the necessity of imposing any substantial axial loading on the gears which would tend to frictionally retard rotation of them.

Description of a modification of the preferred embodiment

Referring now to FIG. 7, a modification of my invention is shown. The pair of spacer bars 98 which extend between thrust washers 84 and 92 are replaced with a plurality of pairs of short spacer bars 106, 108, 110 and 112 disposed between the external splines 36 on shaft 14. These spacer bars abut the adjacent clutch hubs 66 and 80 and thrust washer 88, as shown, the entire assembly of spacer bars and clutch hubs and thrust washer being held from longitudinal movement between thrust washers 84 and 92. The length of spacer bars 106, 108, 110 and 112 is chosen so that the required running celarance for gears 42, 44 and 46 is provided and the gears are maintained in their proper location without any axial load on them.

While I have described only a single embodiment of my invention and a modification thereof in the foregoing description, it will be understood that this description is for the purpose of illustration only and that my invention is susceptible to various modifications, changes and rearrangements of structure which still fall within the scope and spirit of my invention. For example, a greater or lesser number of hubs and gears may be positioned on the splined shaft, and also while the preferred embodiment shows two bars for positioning the hubs and gears the hubs and gears may be positioned with only one bar. Therefore, the limits of my invention should be determined from the following appended claims.

I claim:

1. The combination comprising an elongated shaft, the said shaft having at least one longitudinally extending groove therein, an annular member carried by the said shaft, the said annular member having a portion which extends into the said groove, spacer means disposed in the said groove and in engagement with the said portion, and means for preventing longitudinal movement of the said spacer means so that longitudinal movement of the said annular member is prevented.

2. The combination as set forth in claim 1 wherein the said spacer means includes a bar, the said bar having a groove therein which engages the said portion.

3. The combination as set forth in claim 1 wherein the said spacer means includes a pair of bars, each bar being disposed in engagement with opposite ends of the said portion.

4. The combination as set forth in claim 2 wherein the said movement preventing means includes a thrust washer and including a gear carried by the said shaft and rotatable relative thereto, the said gear being disposed intermediate the said annular member and washer.

5. The combination as set forth in claim 3 wherein the said movement preventing means includes a thrust washer and including a gear carried by the said shaft and rotatable relative thereto, the said gear being disposed intermediate the said annular member and washer.

6. The combination comprising an elongated shaft, the said shaft having external splines, an annular member carried by the said shaft, the said member having internal splines which cooperate with the said external splines so that the said member is connected to the said shaft for conjoint rotation, spacer means disposed intermediate two of the said external splines and in engagement with one of the said internal splines so that movement of the said annular member longitudinally of the said spacer means is limited, a gear carried by the said shaft and rotatable relative thereto, and means for preventing movement of the said spacer means longitudinally of the said shaft and retaining the said gear on the said shaft.

7. The combination as set forth in claim 6 wherein the said spacer means includes a bar, the said bar having a groove therein which engages the said internal spline.

8. The combination as set forth in claim 6 wherein the said spacer means includes a pair of bars, each bar being disposed in engagement with opposite ends of the said internal spline.

9. The combination as set forth in claim 7 wherein the said movement preventing means includes a thrust washer which engages one end of the said bar.

10. The combination as set forth in claim 9 wherein the said gear is disposed intermediate the said annular member and the said thrust washer.

11. The combination as set forth in claim 6 wherein the said movement preventing means includes a pair of longitudinally spaced apart stops on the said shaft, first and second bearing races carried by the said shaft, each race being disposed in abutment with a different one of the said stops, and first and second thrust washers carried by the said shaft, each washer being disposed in abutment with a different one of the said races and with the said spacer means.

12. The combination as set forth in claim 11 wherein the said shaft includes a shoulder thereon and one of the said races and one of the said washers are disposed intermediate the said shoulder and one of the said stops and held from movement longitudinally of the said shaft by the said shoulder and one stop.

13. The combination comprising an elongated shaft, the said shaft having external splines, at least one clutch hub carried by the said shaft, at least one thrust washer carried by the said shaft and spaced longitudinally apart from the said hub, the said hub and washer having internal splines which cooperate with the said external splines to connect the said hub and washer to the said shaft for conjoint rotation, at least one bar disposed intermediate two of the said external splines, the said bar including a first groove which engages the said hub and a second groove which engages the said washer so that the longitudinal positions of the said hub and washer are substantially fixed relative to each other and the said bar, means for preventing longitudinal movement of the said bar, the said means including a second thrust washer, and a pair of gears carried by the said shaft and rotatable relative thereto, each gear being disposed intermediate the said hub and a different one of the said washers.

References Cited

UNITED STATES PATENTS

| 876,083 | 1/1908 | Parker | 74—371 |
| 2,812,840 | 11/1957 | Winter et al. | 74—375 X |
| 3,028,763 | 4/1962 | Vetsch | 74—371 |
| 3,184,984 | 5/1965 | Erdman et al. | 74—363 X |
| 3,353,422 | 11/1967 | Dangauthier | 74—375 |

ARTHUR T. McKEON, Primary Examiner